M. LEWELLIN.
Cultivators.
No. 137,221. Patented March 25, 1873.
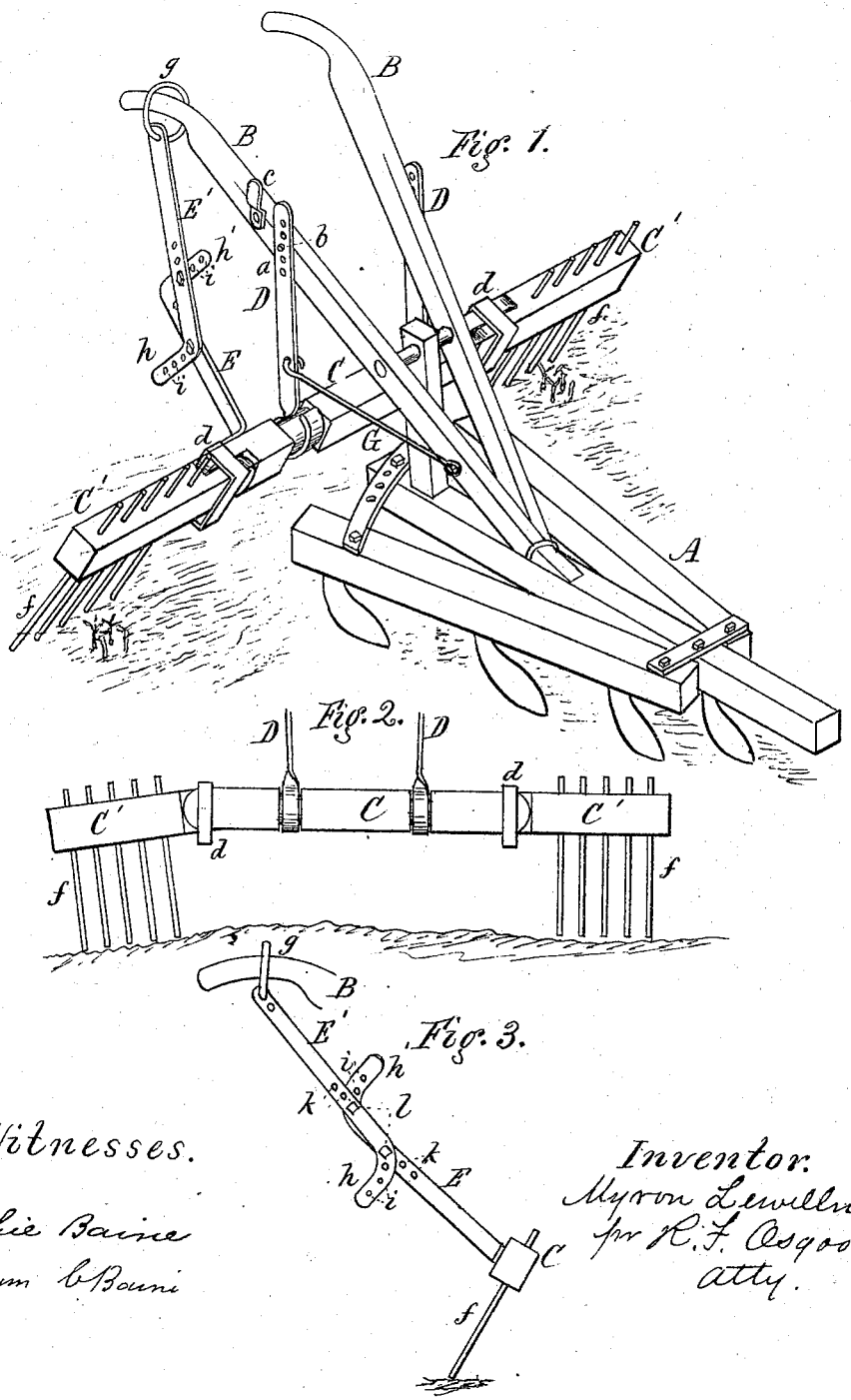
Witnesses.
Archie Baine
William C Baine
Inventor:
Myron Lewellin,
pr R. F. Osgood,
atty.

UNITED STATES PATENT OFFICE.

MYRON LEWELLIN, OF BERGEN, NEW YORK.

IMPROVEMENT IN CULTIVATORS.

Specification forming part of Letters Patent No. 137,221, dated March 25, 1873.

*To all whom it may concern:*

Be it known that I, MYRON LEWELLIN, of Bergen, in the county of Genesee and State of New York, have invented a certain new and useful Improvement in Cultivators; and I do hereby declare that the following is a full, clear, and exact description of the construction and operation of the same.

My invention consists of an attachment for an ordinary cultivator, so arranged as to turn to different positions, and having jointed heads, armed with teeth, for the purpose of raking through the rows, and thus freeing them of weeds and dirt; also of an adjusting-brace of peculiar construction, and a loop for attaching to one of the handles, all as hereinafter described.

In the drawing, Figure 1 is a perspective view; Fig. 2, a rear view of the swiveled cross-beam; Fig. 3, a view of the jointed brace.

A represents the cultivator, and B B its handles. These parts are of ordinary construction, and the cultivator simply passes between the rows in the ordinary manner. C is a cross-beam in the rear, which is swiveled or hung in two pendent bearings, D D, suspended from the handles. These bearings have a series of adjusting-holes, $a\ a$, which fit over studs $b$ of the handles, by which said bearings are adjusted up and down, to raise and lower the cross-beam; and the bearings are retained in place by buttons $c\ c$, which turn down over the studs. To the ends of the cross-beam are jointed or pivoted the head C' C', so as to turn up and down vertically; and this motion is gaged by stirrups or loops $d\ d$. Each head is armed with a series of teeth, $f\ f$, whose purpose is to follow the line of the rows, and sweep through and clear the hills of weeds and dirt, as the cultivator proper cuts up and pulverizes the soil between the rows. To the back of the cross-beam is attached a stiff brace-bar, E, and with this connects a similar bar, E', having at its upper end a leathern loop, $g$, which passes over one of the handles of the cultivator, as clearly shown in Fig. 1. The ends of the brace-bars E' E' have bends $h\ h'$, which stand reversely to each other, and in each of these is made a series of holes, $i\ i$. The shanks of said bars also have holes $k\ k$. Pins $l\ l$ connect the parts together by passing through these holes, and thus enable the cross-beam and its connecting heads and teeth to be set at any angle relatively with the soil. This is essential in cultivating crops in different stages of growth. When the plants are small, the teeth are set at a backward angle, as shown in Fig. 1, and in subsequent cultivations, as they grow larger, the teeth are set more upright, till the final one, when they may stand nearly or quite vertical. This adjustment is attained by means of the bends $h\ h'$ of the brace-bars. The loop $g$ is of sufficient size for the hand of the operator to pass through it when holding the handle of the cultivator, and also of sufficient size to be slipped off the handle when desired. When the end of the row is reached, the loop is slipped from the handle, which allows the cross-beam to turn flat, to dump the load of weeds that may have gathered, and also to drag flat in turning the corners of the rows. The bearings D D are connected with the front of the handles by brace-rods G G.

This attachment to a common cultivator enables the hills to be cleared and swept from weeds and dirt at the same time that the soil is pulverized between the rows. It is an objection to common cultivators that they simply cultivate the space between the rows, and throw the dirt over upon the rows. The teeth passing through the rows will always keep the plants from being covered, and I have found from practical use that no harm can result therefrom, even when the plants are of the tenderest growth. By setting the teeth at a backward angle, the tenderest crop can be cultivated without disturbing the plants, and the process of hoeing is greatly facilitated. The jointed heads C' C' are of importance in this respect, as they yield under pressure, and therefore prevent heavy weight being dragged over the plants. They also yield to the inclined surfaces of the hills, and therefore adapt themselves to place.

Having thus described my invention, what I claim, and desire to secure by Letters Patent, is—

The cross-beam C, with jointed heads C' C', the bearings D D, stirrups $d\ d$, brace-bars E E', and loop $g$, when combined and arranged with an ordinary cultivator, in the manner and for the purpose specified.

In witness whereof I have hereunto signed my name in presence of two subscribing witnesses.

MYRON LEWELLIN.

Witnesses:
 R. F. OSGOOD,
 ARCHIE BAINE.